United States Patent
Shin et al.

(10) Patent No.: US 11,363,252 B2
(45) Date of Patent: Jun. 14, 2022

(54) IMAGE SENSING DEVICE AND OPERATING THE SAME

(71) Applicant: SAMSUNG ELECTRONICS CO., LTD., Suwon-si (KR)

(72) Inventors: Ji Hun Shin, Seongnam-si (KR); Se-Jun Kim, Seoul (KR); Bu Yong Um, Seongnam-si (KR); Young Tae Jang, Pyeongtaek-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/036,908

(22) Filed: Sep. 29, 2020

(65) Prior Publication Data

US 2021/0266522 A1 Aug. 26, 2021

(30) Foreign Application Priority Data

Feb. 26, 2020 (KR) .................. 10-2020-0023313

(51) Int. Cl.
*H04N 17/00* (2006.01)
*H04N 17/02* (2006.01)
*H04N 5/232* (2006.01)
*H04N 5/225* (2006.01)

(52) U.S. Cl.
CPC ......... *H04N 17/002* (2013.01); *H04N 5/2253* (2013.01); *H04N 5/23245* (2013.01)

(58) Field of Classification Search
CPC .... H04N 17/00; H04N 17/002; H04N 5/2253; H04N 5/23245; H04N 17/02; H04N 5/217; H04N 9/64

USPC ......................................... 348/175, 187, 176
See application file for complete search history.

(56) References Cited

U.S. PATENT DOCUMENTS

| | | | |
|---|---|---|---|
| 7,786,921 B2 | 8/2010 | Nitta et al. | |
| 7,804,052 B2* | 9/2010 | Chinnaveerappan | H04N 17/002 |
| | | | 250/208.1 |
| 8,730,330 B2 | 5/2014 | Solhusvik et al. | |
| 8,803,979 B2* | 8/2014 | Solhusvik | H04N 5/378 |
| | | | 348/187 |
| 9,001,247 B2 | 4/2015 | Saito et al. | |
| 9,131,211 B2 | 9/2015 | Johnson | |
| 9,191,596 B2 | 11/2015 | Sonoda | |
| 9,294,701 B2 | 3/2016 | Sonoda et al. | |
| 9,432,599 B2 | 8/2016 | Sonoda | |

FOREIGN PATENT DOCUMENTS

JP 2011-171950 A 9/2011

* cited by examiner

*Primary Examiner* — Trang U Tran
(74) *Attorney, Agent, or Firm* — Sughrue Mion, PLLC

(57) ABSTRACT

A method of operating an image sensing device includes applying control voltages to a pixel array in accordance with a test mode and performing an analog-to-digital conversion of a column line voltage to obtain one or more digital codes. The one or more digital codes are evaluated to detect an operating error associated with the column line and/or corresponding analog to digital converter. In response to an operating error, pixel values may be replaced or averaged with nearby pixel outputs not affected by the operating error.

13 Claims, 9 Drawing Sheets

IMAGE SENSING DEVICE AND OPERATING THE SAME

This application claims priority from Korean Patent Application No. 10-2020-0023313 filed on Feb. 26, 2020 in the Korean Intellectual Property Office, the disclosure of which is incorporated herein by reference in its entirety.

BACKGROUND

1. Field

Embodiments of the present disclosure relate to an image sensing device, and more particularly, to an image sensing device that may be mounted on an automobile to minimize malfunction, and an operating method thereof.

2. Description of Related Art

Recently, importance of an electronic control device has increased in automobiles. There is a need to satisfy requirements of ISO26262 (ASIL, Automotive Safety Integrity Level) in order to minimize accidents due to malfunction of electronic control devices and electrical components.

Since the image sensing device is also one of the electrical components and is required to satisfy the requirements of ASIL, there is a need for a functional stability (Safety Function) design.

SUMMARY

One or more example embodiments provide an image sensing device in which functional stability is improved.

One or more example embodiments also provide an operating method of an image sensing device in which functional stability is improved.

According to an aspect of an example embodiment, there is provided a method of operating an image sensing device, the method including: applying control voltages to a plurality of pixels of a first row of a pixel array in accordance with a test mode, wherein the plurality of pixels includes a first pixel, and the pixel array includes a plurality of column lines, performing an analog-to-digital conversion of one or more column line voltages, into one or more digital codes; and detecting an operating error on a basis of the one or more digital codes.

According to an aspect of an example embodiment, there is provided an image sensing device including: an analog logic unit configured to: select at least one row among a plurality of rows of a pixel array in accordance with a test mode, apply control voltages to a plurality of pixels, wherein the plurality of pixels includes a first pixel, and the pixel array includes a plurality of column lines, and output one or more digital codes obtained from one or more column line voltages; and a digital logic unit configured to: control an operating mode, serially receive input of the one or more digital codes depending on a column order in the test mode, compare the one or more digital codes with a threshold value, and detect an operating error.

According to an aspect of an example embodiment, there is provided an image sensing device including: a pixel array including a plurality of pixels arranged in at least one row and at least one column, wherein the plurality of pixels includes a first pixel, and the pixel array includes a plurality of column lines; a row driver configured to select and control the at least one row; a column-parallel analog-digital-converter (ADC) configured to convert a column line voltage into one or more digital codes; digital logic unit configured to: continuously receive input of the one or more digital codes in a column order, and execute an operating error detection when in a test mode; and an image signal processor configured to receive and process the one or more digital codes when in a normal mode.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

DETAILED DESCRIPTION

Hereinafter, example embodiments will be described with reference to the accompanying drawings.

Figure 1:
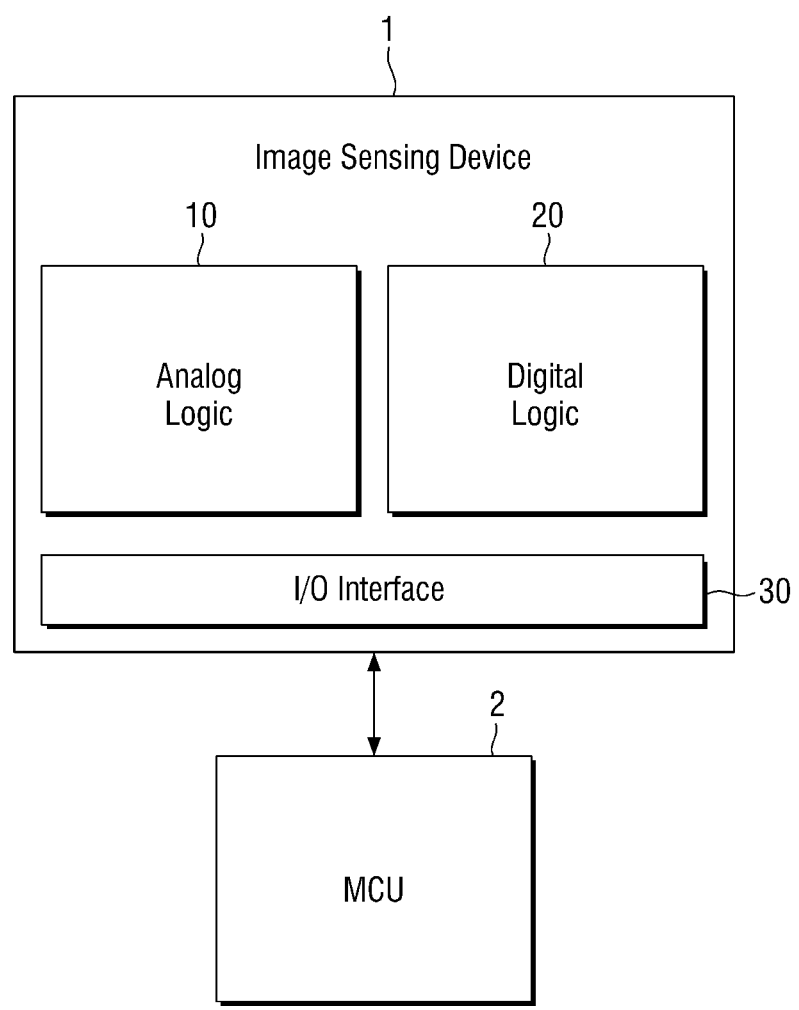
FIG. 1 is a block diagram showing an image sensing device according to some embodiments.
Figure 2:
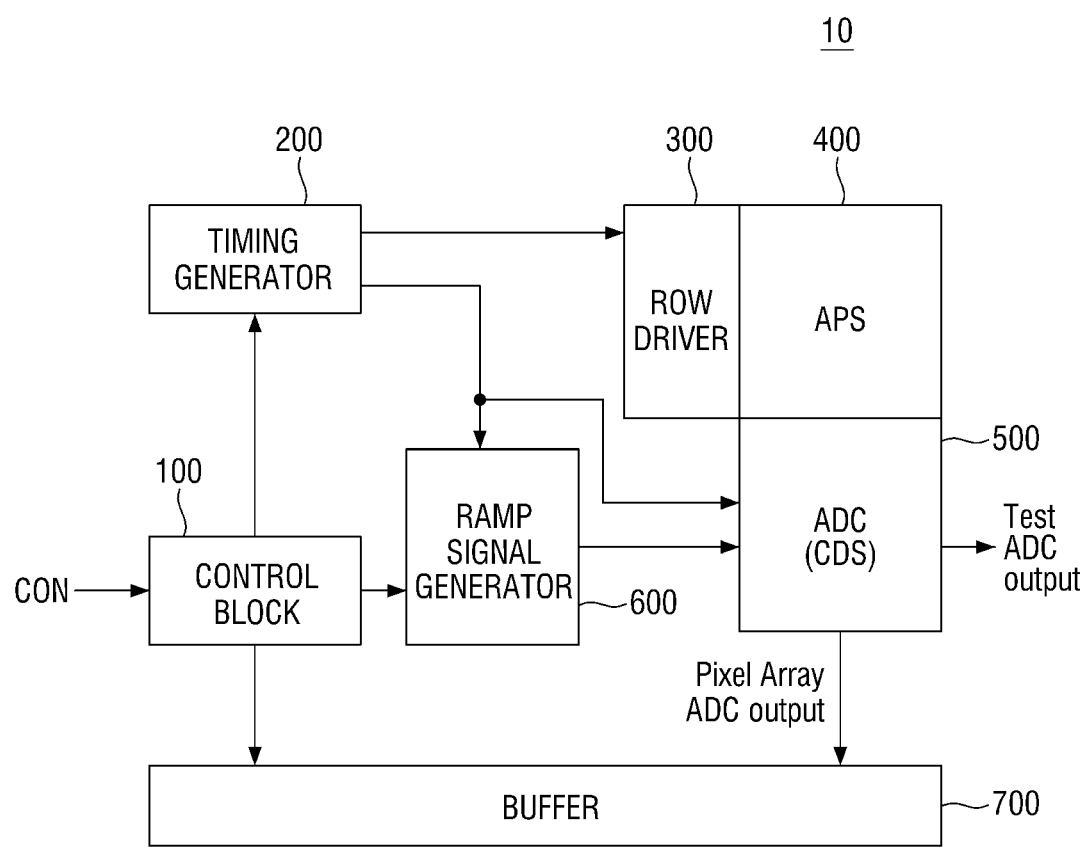
FIG. 2 is a diagram specifically showing analog logic unit of FIG. 1, according to some embodiments.
Figure 3:
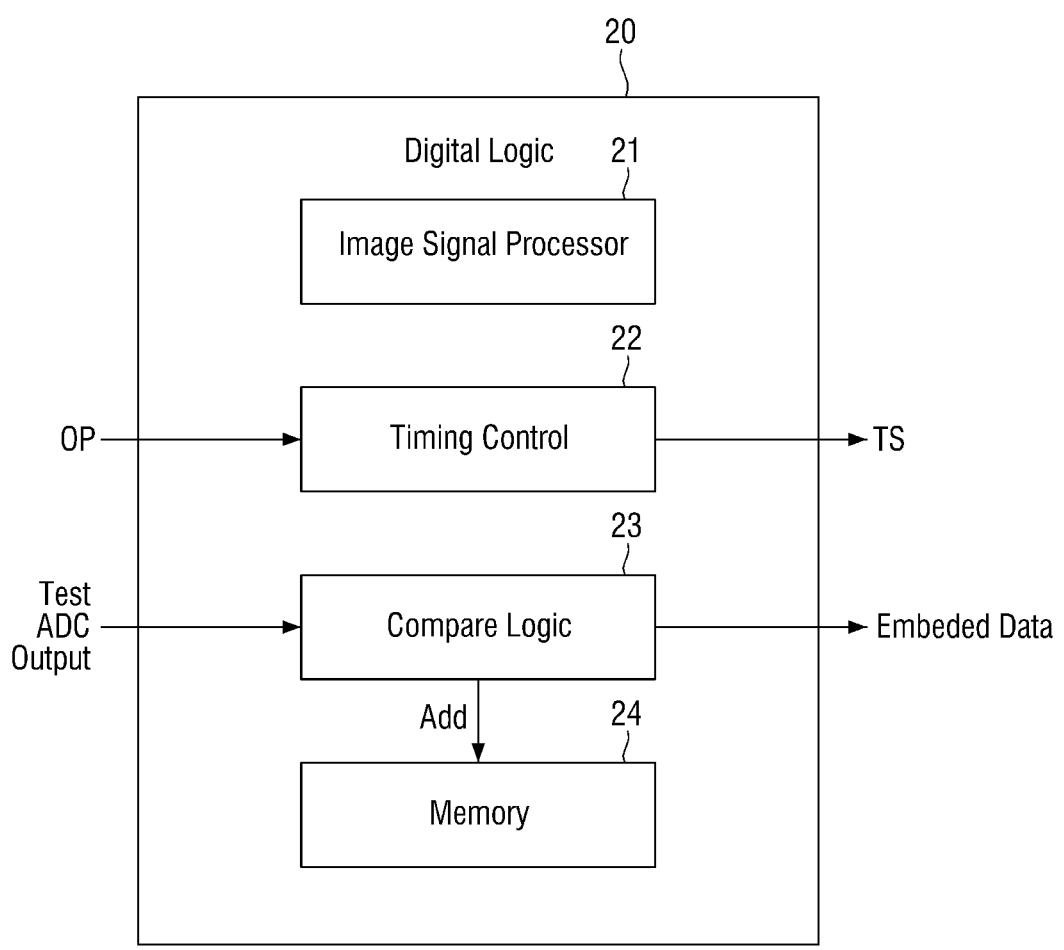
FIG. 3 is a diagram specifically showing digital logic unit of FIG. 1, according to some embodiments.

FIG. 1 is a block diagram showing an image sensing device according to some embodiments, FIG. 2 is a diagram specifically showing analog logic unit of FIG. 1, and FIG. 3 is a diagram specifically showing digital logic unit of FIG. 1.

Referring to FIGS. 1, 2, and 3, the electronic device includes an image sensing device 1 and an Micro Controller Unit (MCU) 2. The MCU may be implemented as custom hardware, application specific integrated circuit (ASIC), and/or a processor configured to execute instructions. The image sensing device 1 may operate by being connected to the MCU 2. The MCU 2 may control the operation of the electronic device, and if an error of the image sensing device 1 is detected, the MCU 2 may control or limit the operation of the image sensing device 1 depending on the degree of the error or may determination whether to replace the image sensing device 1.

The image sensing device includes an analog logic unit 10, a digital logic unit 20 and an input/output interface 30. Each logic unit may be implemented as custom hardware, an ASIC, and/or a processor configured to execute instructions.

The analog logic unit 10 may photoelectrically convert the light incident on the photodiode to generate a pixel signal, convert the pixel signal into a digital signal, and transmit the digital signal to the digital logic unit 20. To satisfy the ASIL requirements according to some embodiments, the analog logic unit 10 may select at least one row of the plurality of pixels in a test mode to apply an input voltage, and may output the digital code obtained by converting the pixel values output from the pixels of the selected row to the digital logic unit 20 in a column-parallel manner.

In the normal mode, the digital logic unit 20 may detect an error from the digitally converted pixel signal, perform image processing, and output a final image sensed by the image sensor to the input/output interface 30. According to some embodiments, the digital logic unit 20 serially receives input of the digital code operates according to the order of the columns in the test mode, compares the digital code with a preset threshold value, and may detect an operating error. That is, in the normal mode, the digital code may be received in the column-parallel manner, and in the test mode, the digital code may be received in a column-serial manner. A more specific description will be provided in the digital logic unit 20.

The input/output interface 30 outputs the image data processed by the image signal processor 21 to an external device.

The analog logic unit 10 may include a control block 100, a timing generator 200, a row driver 300, a pixel array 400, an ADC (CDS) block (Analog-to-Digital Converter/Correlated Double Sampling) 500, a ramp signal generator 600, and a buffer 700.

The control block 100 controls the operations of the timing generator 200, the ramp signal generator 600, and the buffer 700 in accordance with the control of the digital logic unit 20.

The timing generator 200 may control the operations of the row driver 300, the ADC (CDS) block 500, and the ramp signal generator 600 in accordance with the control of the control block 100.

The row driver 300 drives the control signals for controlling the operation of each pixel to the pixel array 400 in accordance with the control of the timing generator 200. The row driver 300 may select and enable at least one row in accordance with the operating mode of the image sensing device 1. The image sensing device 1 operates in a frame cycle, and operates in a normal mode after passing through a test mode for each frame to detect an error in the image sensing device 1 in real time. For example, a frame cycle may consist of one frame after the other occurring with a frame period. Thus, a frame cycle may include a plurality of frames. Within each frame both test operations and normal image acquisition operations can occur. In this way, an image sensing device may be operated over time with respect to the frame cycle.

According to some embodiments, when the image sensing device 1 is in the test mode, the row driver 300 may select and enable a specific row and disable the remaining rows. In an embodiment, when the image sensing device 1 is in a high test mode, the row driver 300 may select and enable only an uppermost row of the pixel array 400. At this time, the uppermost row means a row that is farthest from the ADC (CDS) block 500. In another embodiment, when the image sensing device 1 is in a low test mode, the row driver 300 turns off all the pixels in the pixel array 400 and may enable only the ADC (CDS) block 500.

The pixel array 400 includes pixels arranged in a matrix form. The pixel array 400 may include a plurality of pixels arranged in at least one row and at least one column, and the pixels may be placed in a single layer and may be placed in two or more layers stacked vertically according to various embodiments.

Each pixel may include a plurality of transistors and photodiodes. Each pixel may be implemented as three transistors connected to a photodiode PD or may be implemented as four transistors according to various embodiments.

The ADC (CDS) block 500 performs correlated double sampling on the pixel values that are output from each of the plurality of column lines implemented in the pixel array 400, and may compare the correlated double sampled pixel value with the ramp signals output from the ramp signal generator 600 with each other to output a plurality of comparison signals. Further, the ADC (CDS) block 500 may convert each of the plurality of output comparison signals into a digital signal and output the plurality of digital signals to the buffer 700.

The buffer 700 may transmit image data corresponding to the plurality of digital signals (Pixel Array ADC output), which is output from the ADC (CDS) block 500, to the digital logic unit 20.

The digital logic unit 20 may include an image signal processor 21, timing control block 22, comparison logic unit 23, and a memory 24 according to some embodiments. According to another embodiment, the image signal processor 21 and the memory 24 may be placed in another block other than the digital logic unit. Each block or unit may be implemented as custom hardware, an ASIC, and/or a processor configured to execute instructions.

The image signal processor 21 may process image data received from the analog logic unit 10. That is, the image signal processor 21 processes the image data transmitted from the buffer 700 in the normal mode and transmits the processed image data to the input/output interface 30. Further, the image signal processor 21 may control the timing control block 22, the comparison logic unit 23, the memory 24 and the interface 30. Each processor may be implemented as custom hardware, an ASIC, and/or a processor configured to execute instructions.

The timing control block 22 generates various control signals CON for controlling the control block 100 in accordance with the control of the image signal processor 21. According to some embodiments, the timing control block 22 checks the current operating mode OP of the analog logic unit 10 and may output a control signal TS to the control block 100 as to whether to enter the test mode or the normal mode.

When the image sensing device 1 operates in the test mode, the comparison logic unit 23 may serially receive input of the test digital code (Test ADC output) in accordance with the column order, and compare the test digital code with the preset threshold value to detect the operating error of the analog logic unit 10.

The comparison logic unit 23 compares each of the input digital codes with a high threshold value Th_high when operating in the high test mode operation according to some embodiments. If the digital codes of all columns are higher than the high threshold value, it is determined that there is no error (Pass), the preset high embedded data is output. If the digital code of at least one column is lower than the high threshold value, it determined that there is an error (Fail), and the column address Add in which an error is detected may be stored in the memory 24.

The comparison logic unit 23 compares each input digital code with a low threshold Th_low when operating in the low test mode operation according to some embodiments. If the digital codes of all columns belonging to the selected row are lower than the row threshold value, it is determined that there is no error (Pass) and the preset low embedded data is output. If the digital code of at least one column is higher than the low threshold value, it is determined that there is an error (Fail), and the column address Add in which an error is detected may be stored in the memory 24.

The memory 24 may store embedded data and an address (e.g., a column and a row) of the pixel in which an error is detected. After the test mode ends, when operating in the normal mode, the memory 24 notifies the address of the stored pixel to the image signal processor 21, and the image signal processor 21 may process the pixel in which an error is detected. According to some embodiments, the image signal processor 21 may pass over a pixel signal value (Real Pixel ADC Output) of the pixel in which an error is detected in the normal mode. According to some embodiments, the image signal processor 21 may replace the pixel signal value (Real Pixel ADC Output) of the pixel in which an error is detected in the normal mode with a pixel signal value obtained by averaging the pixel signal values from the peripheral pixels of the pixel in which an error is detected. At least one peripheral pixel may be neighbor pixels and/or may be adjacent pixels. The neighbor pixel is at least one the adjacent pixels of a pixel associated with a stored address after detection of failure.

Figure 4:
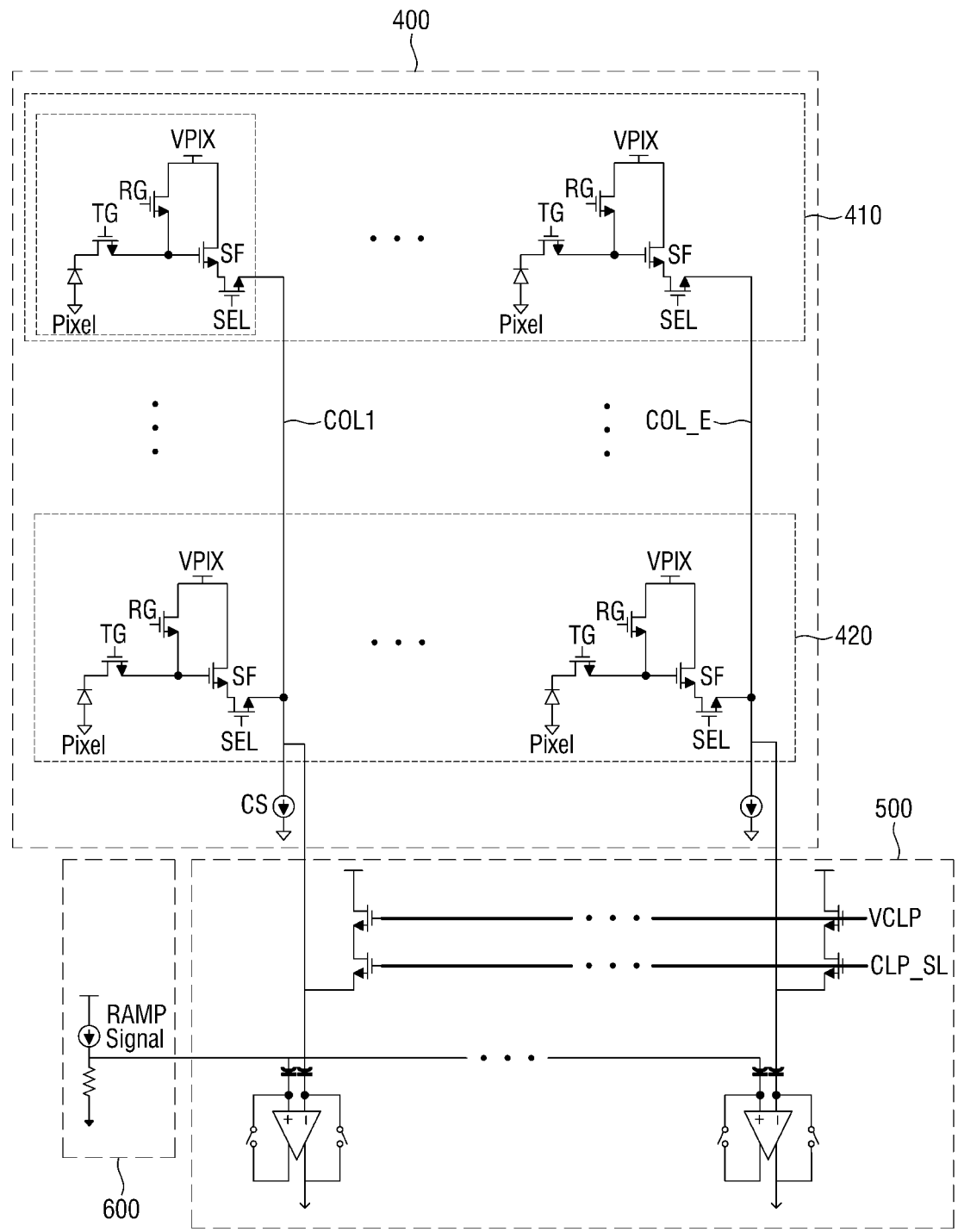
FIG. 4 is a diagram schematically showing a part of the image sensing device for explaining the operation method of the image sensing device according to some embodiments.
Figure 5:
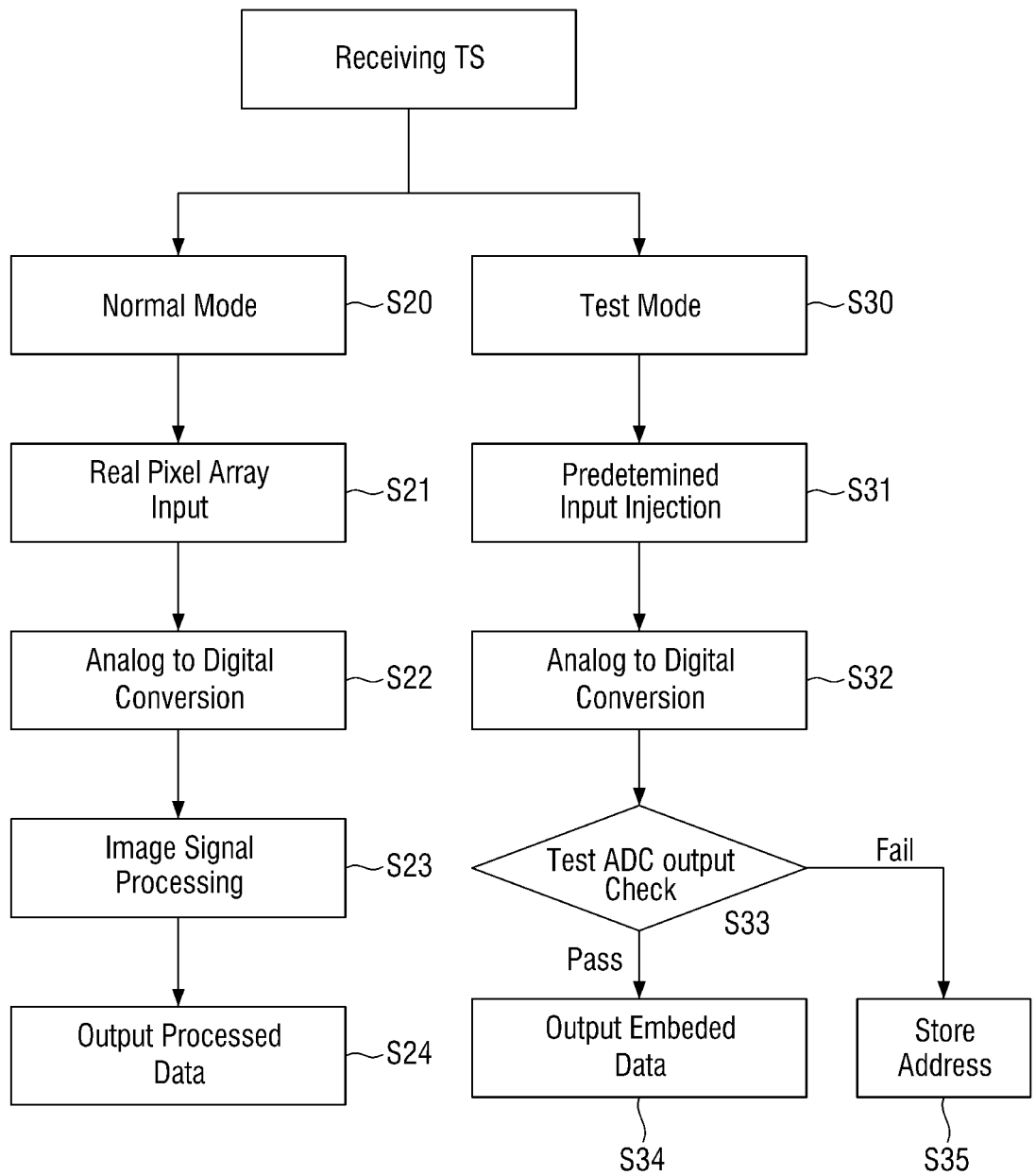
FIG. 5 is a flow chart which explains the operating method of the image sensing device according to some embodiments.

FIG. 4 is a diagram schematically showing a part of the image sensing device for explaining the operation method of the image sensing device according to some embodiments, and FIG. 5 is a flow chart which explains the operating method of the image sensing device according to some embodiments.

Referring to FIGS. 4 and 5, the image sensing device receives the control signal TS of the operating mode and operates in the operating mode (S10). The operation of the image sensing device is performed in a frame cycle, and the image sensing device may operate in the normal mode via the test mode for each frame to detect an operating error in real time. That is, an operating error of the image sensing device may be detected in real time, by turning on/off the access transistor through the row decoder without addition of another circuit and only by the signal which is output by applying the input voltage.

In some embodiments, a frame cycle comprises a number of frames in time. Within each frame, control voltages of transistors of a pixel may be first configured to implement a test mode (reset the charge on the diffusion layer and then turn on and turn off the SEL transistor), and then the voltages may be configured to implement a normal mode (read pixel values caused by photons impinging on the image sensing device).

When operating in the normal mode (S20), the pixels in the pixel array receive the light reflected from the subject, perform a photoelectric conversion, and output pixel signals (S21). The pixel signals (Real Pixel Array Input) are subjected to an analog-digital conversion and correlated double-sampling (S22) and are output as a column-parallel digital code (S22), and the digital code is image-processed (S23) and may be output as a final image (S24).

When operating in the test mode (S30), only one row of the pixels in the pixel array is selected and enabled, the remaining rows are disabled. A preset input voltage is applied to the pixels of the enabled row (S31), and pixel signal (Predetermined Input Injection), which is output from the enabled row, is subjected to the analog-to-digital conversion and the correlated dual-sampling (S32) and may be output as a column-serial digital code (S33). Each digital code (Test ADC output) belonging to the selected row may be compared with a preset threshold value to check if there is an error. If there is no error in digital codes of all columns of the selected row (Pass) (S34), the preset embedded data is output to the interface. If an error occurs in the digital code in any one column (Fail), the address of the pixel in which an error is detected may be stored for consideration in an operation of a future normal mode or a future frame operation (S35).

According to some embodiments, in the high test mode, the image sensing device 1 may select and enable the uppermost row 410 in the pixel array 400, and disable the remaining rows to perform an error detection. Another row may be generally referred to as row 420. When operating in the high test mode, it is possible to detect whether there are short, stuck, open, etc. of the pixel lines COL 1 to COL_E connected to the pixels of the uppermost row.

In the low test mode according to some embodiments, the image sensing device 1 may disable all the pixel arrays 400 to perform the error detection. That is, when operating in the low test mode, the operating error of the ADC (CDS) block 500 may be detected.

Hereinafter, an address in which an error is detected may be used in the process of image signal processing according to some embodiments, or may be known as a MCU and may be used as a basic material for determination of operating performance of the image sensing device according to some embodiments. If the address in which the error is detected exceeds a preset range, the MCU may determine that the image sensing device is abnormal and output a push notification to the electronic device for replacing the image sensing device.

Figure 6:
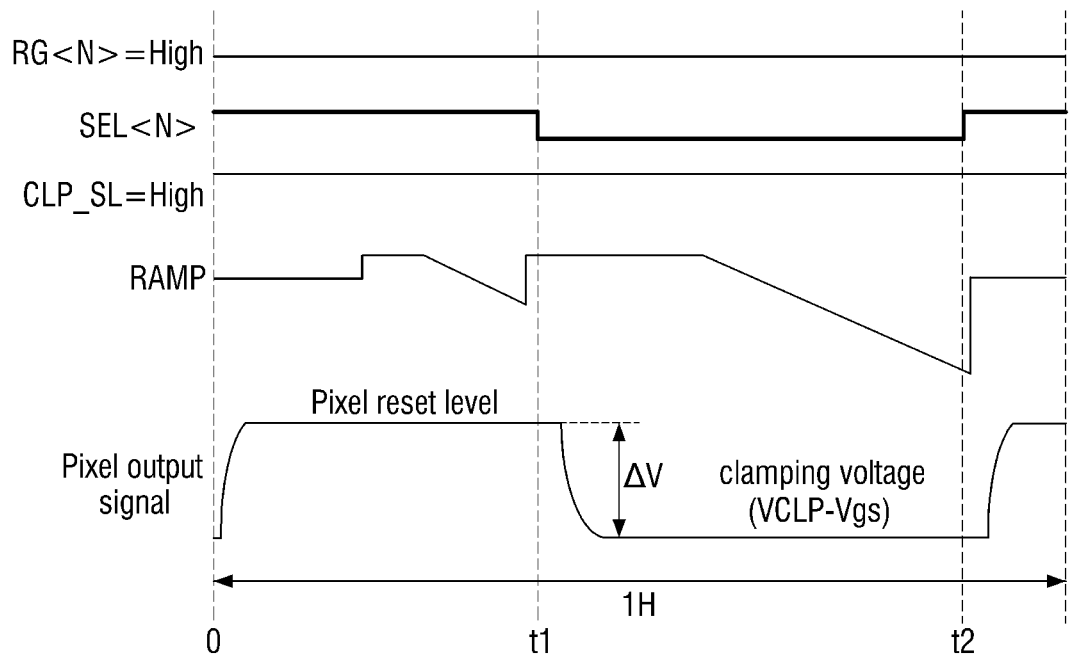
FIG. 6 is a timing diagram when the image sensing device according to some embodiments operates in the high test mode.
Figure 7:
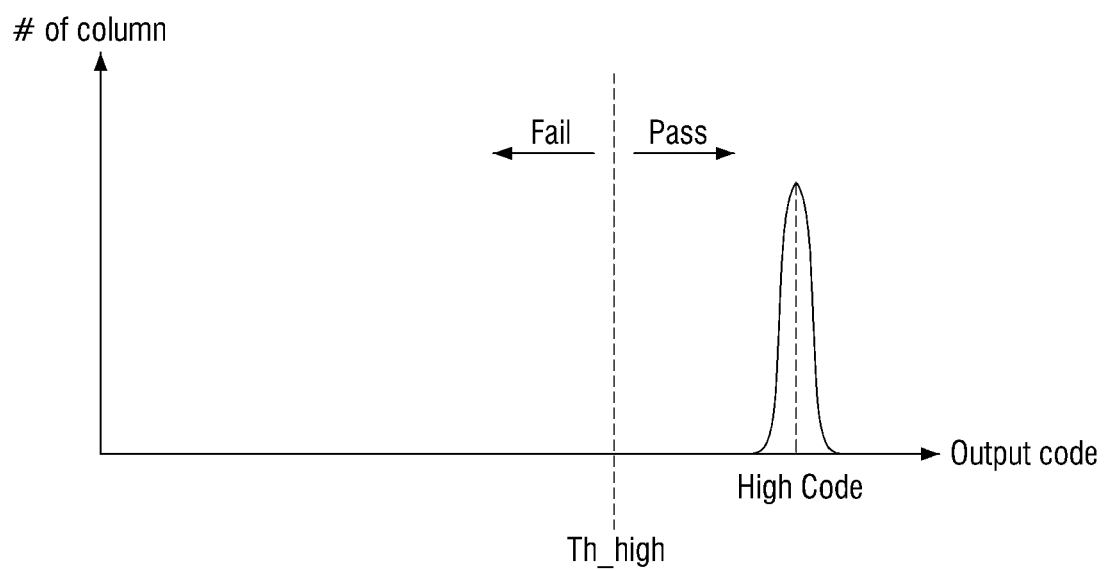
FIG. 7 is a graph for explaining detection of an operating error when operating in the high test mode in FIG. 6, according to some embodiments.
Figure 8:
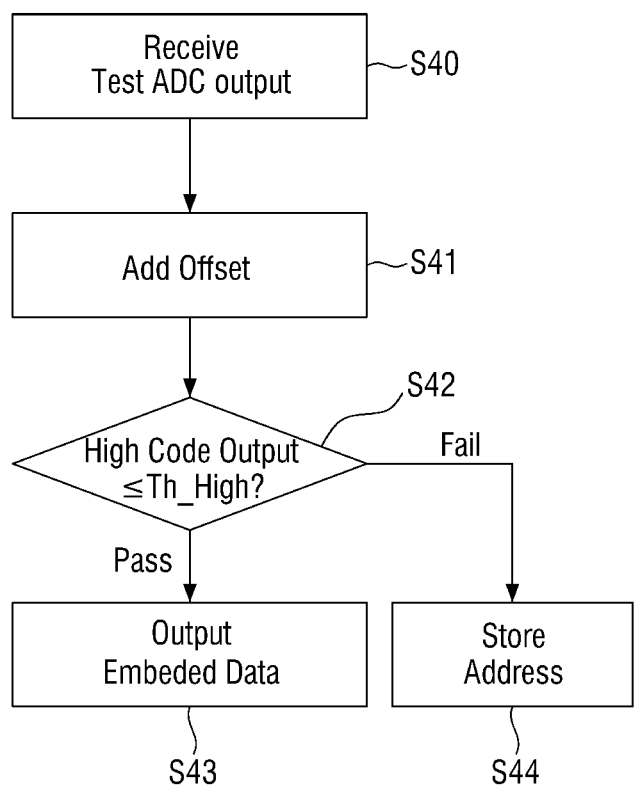
FIG. 8 is a flowchart for explaining an operation method of the image sensing device when operating in the high test mode in FIG. 6, according to some embodiments.

FIG. 6 is a timing diagram when the image sensing device according to some embodiments operates in the high test mode, FIG. 7 is a graph for explaining detection of an operating error when operating in the high test mode in FIG. 6, and FIG. 8 is a flowchart for explaining an operation method of the image sensing device when operating in the high test mode in FIG. 6.

The pixel shown in FIG. 4 is implemented as four transistors and may include a transmission transistor TG, a reset transistor RG, a selection transistor SF, and an access transistor SEL. Although the pixel structure of FIG. 4 will be described for convenience of explanation, the present disclosure is not limited thereto and may be applied to an image sensing device having a pixel structure including at least one or more transistors and photodiodes Referring to FIG. 4, in the image sensing device, in the normal operation, when the reset transistor RG is turned on, an output floating diffusion node FD has a potential of the input voltage VPIX and is set as a reference value. The output floating diffusion node FD is the common node shared by the source of the transistor TG, the source of the transistor RG and the gate of the transistor SF. When light is incident on the photodiode from the outside, photoelectrically converted charges are generated depending on the amount of incident light, and thus, a pixel value, that is, a pixel signal is generated in a source node of the transmission transistor TG to be proportional to an amount of photoelectrically converted charges. When the transmission transistor TG is turned on, the accumulated mount of charges is transferred to the floating diffusion node, and a gate bias of the selection transistor changes by potential changed as compared to the reference value, which causes a change in the source side potential of the selection transistor SF. When the access transistor SEL for a given row is turned on, the pixel signal is read out to the column line COL from the source of the selection transistor SF for the given row. In some embodiments, all the pixels of a particular row may be observed based on assertion of all of the 1, ..., E SEL transistors of the particular row (see FIG. 4).

Referring to FIGS. 4 to 8, the image sensing device always turns on the reset transistor RG when operating in the test mode. This is for the purpose of turning on the reset transistor to detect an operating error of the transistor, the column line COL and other operation circuits (e.g., ADC (CDS) block) regardless of the photodiode. Turning on the reset transistor RG is an example of a control voltage.

The image sensing device may further include a clamping circuit in the ADC (CDS) block 500. The pixel signal output from the column line is compared with the ramp signal in the block of the ADC (CDS) block and subjected to analog-digital conversion, but the clamping circuit may apply the clamping voltage to the pixel signal to prevent the pixel output signal VCLP-Vgs from dropping below a preset low voltage range.

In a high test mode section, the reset transistor and the clamping circuit may be continuously turned on. This is because the clamp voltage VCLP needs to be always applied to the pixel output signal so that the variable may be minimized at the time of error detection.

A pixel output signal (Pixel rest level) based on a reference value according to the present input voltage VPIX is output to the floating diffusion node in the section from 0 to t1 of the high test mode. When the access transistor SEL is turned on and then turned off at the time t1, after the time t1, the charges remaining in the column line gradually escape through the current source CS until the access transistor SEL is turned on again (ΔV), and the pixel output signal drops close to the clamp voltage (VCLP-Vgs).

If any point of the column line is open, short or stuck, the pixel output signal between times t1 and t2 may not appear as shown in FIG. 6. In this case, even if the pixel output signal is converted into a digital code, the pixel output signal may have a value lower than the high threshold value as compared to the high threshold value Th_high shown in FIG. 7. In this case, it may be determined that an error has occurred in that column. Thus, a voltage on a column line after the control voltage of transistor RG is switched from on to off is used to detect an operating error of the column line. The ordinate (or y axis) of FIG. 7 indicates a frequency of occurrence (number of columns or "# of column") or likelihood of observing a particular output code.

In summary, when operating in the high test mode, only the uppermost row 410 may be selected and enabled. This can detect an error of the column line. When operating in the high test mode section, a test digital code (Test ADC output) is received from the pixels belonging to the uppermost row 410 (S40).

The digital logic unit 20 may be added with an offset for noise filtering of the test digital code (S41). The test digital code added with an offset may be serially compared with a high threshold value in a column order (S42).

When no error is detected as a result of comparing the high threshold value with the test digital codes of all columns (Pass), the digital logic unit 20 outputs a preset high embedded data (S43). On the other hand, if a test digital code of any one column has a value smaller than the high threshold value and is determined to be an error, the address of the column in which an error occurs is stored (S44).

Figure 9:
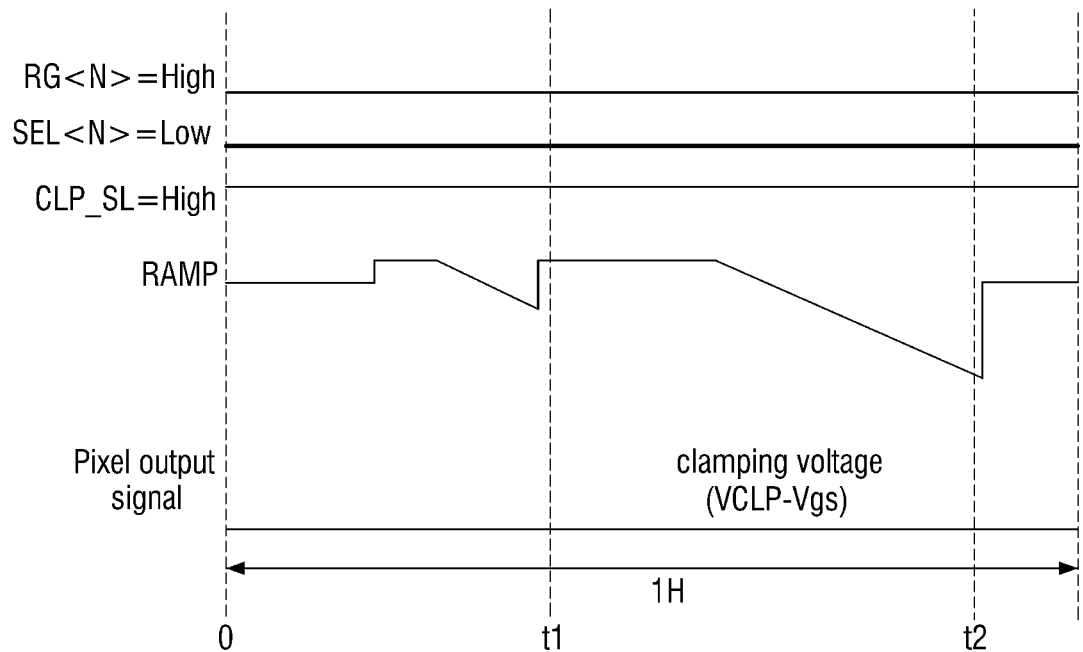
FIG. 9 is a timing diagram when the image sensing device according to some embodiments operates in the low test mode.
Figure 10:
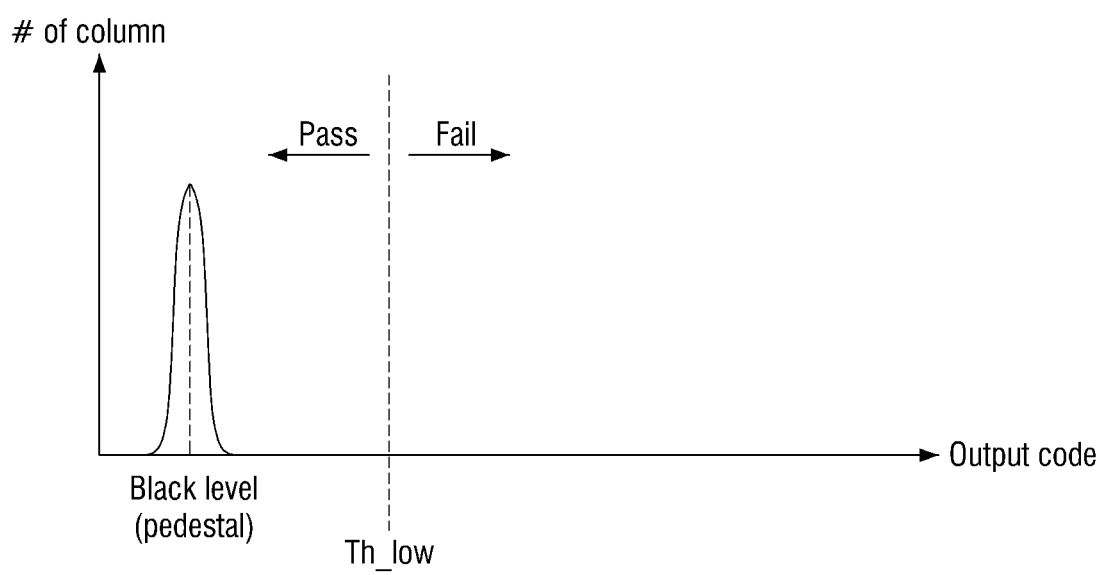
FIG. 10 is a graph showing detection of an operating error when operating in the low test mode.
Figure 11:
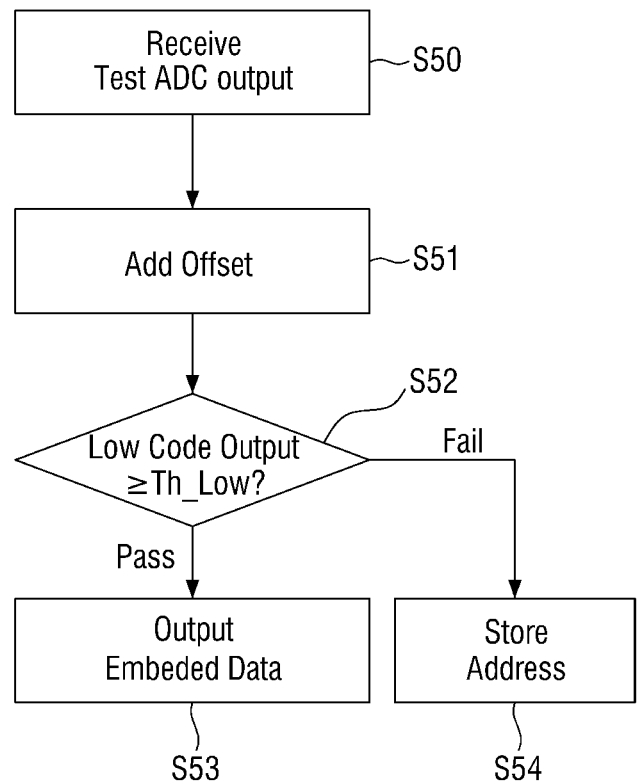
FIG. 11 is a flowchart for explaining an operation method of the image sensing device when operating in the low test mode in FIG. 9.

FIG. 9 is a timing diagram when the image sensing device according to some embodiments operates in the low test mode, FIG. 10 is a graph showing detection of an operating error when operating in the low test mode, and FIG. 11 is a flowchart for explaining an operation method of the image sensing device when operating in the low test mode in FIG. 9.

Referring to FIGS. 4 and 9 to 11, the image sensing device always turns on the reset transistor when operating in the test mode. This is for the purpose of turning on the reset transistor to detect an operating error of the transistors, the column line COL and other operation circuits (for example, ADC (CDS) block) regardless of the photodiode. For example, the photodiode may be operating properly, but an intervening circuit such as the column line is shorted to another circuit, is open circuit (no complete conductive path to the ADC), or the ADC itself is not functioning.

The image sensing device may further include a clamping circuit in the ADC (CDS) block 500. The pixel signal output from the column line is compared with the ramp signal in the ADC (CDS) block and is subjected to analog-digital conversion, but the clamping circuit may apply the clamping voltage to the pixel signal to prevent the pixel output signal (VCLP-Vgs) from dropping below a preset low voltage range.

In a low test mode section, the reset transistor and the clamping circuit may be continuously turned on. This is because the clamp voltage VCLP also needs to be always applied to the pixel output signal so that the variables can be minimized at the time of error detection.

On the other hand, in the low test mode, the access transistor is always kept in the turned-off state. By turning off and disabling all the pixel arrays and checking only the operating state of the ADC (CDS) block, the operating error of the analog-digital conversion circuit connected to each column may be detected.

Since the access transistor is continuously turned off in the section from 0 to t2, the charges remaining in the column line may keep a state of escaping through the current source CS regardless of the influence on the floating diffusion node, and the output of the analog-digital conversion circuit connected to each column line keeps a state close to the clamp voltage (VCLP-Vgs, Vgs=0).

If any analog-to-digital conversion circuit in the ADC block 500 does not operate properly, the pixel output signal may not appear as shown in FIG. 9. In this case, even when the pixel output signal is converted into a digital code, the pixel output signal may have a value higher than the low threshold value as compared to the low threshold value Th_low shown in FIG. 10. In this case, it may be determined that an error has occurred in that column.

In summary, all pixels may be disabled when operating in the low test mode. For example, in some embodiments, control voltages such as those controlling all the access transistors of type SEL are configured to de-select all pixels when operating in the low test mode. In this case, each pixel is electrically isolated from its corresponding column line. When operating in the low test mode section, a test digital code (Test ADC output) which is output only by the operation of the ADC block is received (S50).

The digital logic unit 20 may be added with an offset for noise filtering of the test digital code (S51). The test digital code added with the offset may be serially compared with the low threshold value in the column order (S52).

If no error is detected as a result of comparing the low threshold value with the test digital code of all columns (Pass), the digital logic unit 20 outputs the preset low embedded data (S53). On the other hand, if the test digital code of any column has a value higher than the low threshold value and is determined to be an error, the address of the column in which an error occurs is stored (S54).

Figure 12:
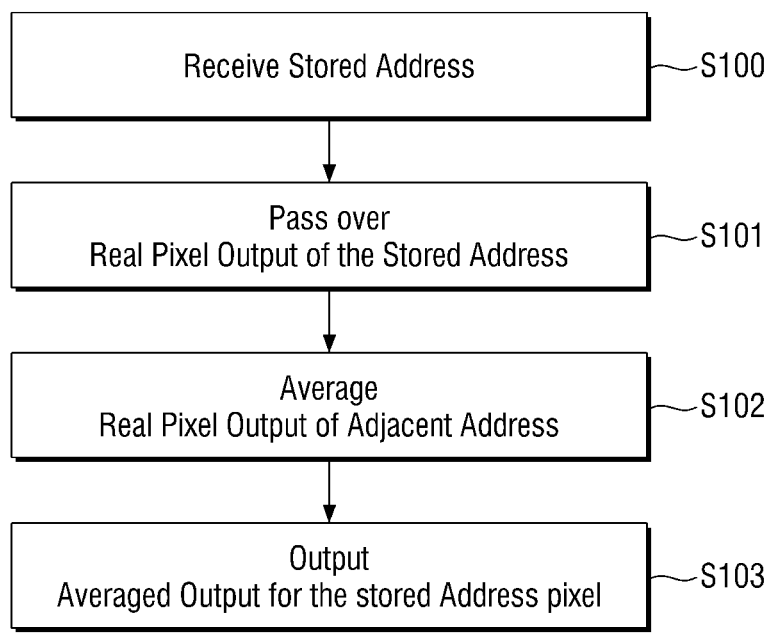
FIG. 12 is a flowchart for explaining an operating method of the image sensing device according to some embodiments

FIG. 12 is a flowchart for explaining an operating method of the image sensing device according to some embodiments.

According to some embodiments, the image signal processor 21 of the image sensing device may process the pixel output signal so that a normal image may be output in the normal mode using the address of the pixel (or column line) found in error stored in the memory 24.

Referring to FIG. 12, the image signal processor receives the stored address (S100), passes over or disregards the pixel output signal from that address (a column in an embodiment) at the time of the normal operation (S101), and may replace the pixel value of that address with another value. The pixel output values of an adjacent address (at least one side column in an embodiment) of the stored address are averaged (S102), and the pixel value to be replaced may be output as the pixel value of that address (S103).

In concluding the detailed description, those skilled in the art will appreciate that many variations and modifications may be made to the embodiments without substantially departing from the principles of the present disclosure. Therefore, the disclosed embodiments are used in a generic and descriptive sense only and not for purposes of limitation.

What is claimed is:

1. A method of operating an image sensing device, the method comprising:
    applying control voltages over time with respect to a frame cycle to a plurality of pixels of a first row of a pixel array in accordance with a high test mode, a low test mode and a normal mode for a frame of the frame cycle, wherein the plurality of pixels comprises a first pixel, and the pixel array comprises a plurality of column lines,
    performing an analog-to-digital conversion of one or more column line voltages into one or more digital codes; and
    detecting, in the high test mode or the low test mode, an operating error based on the one or more digital codes,
    wherein the high test mode is for testing one or more pixels of the plurality of pixels, and the low test mode is for testing one or more analog-to-digital converters.

2. The method of operating an image sensing device of claim 1, wherein, in the high test mode, the first row is an uppermost row of the pixel array.

3. The method of operating an image sensing device of claim 2, wherein the detecting the operating error comprises, during the high test mode of the frame cycle:
    serially comparing the one or more digital codes and a high threshold value, each digital code of the one or more digital codes corresponding to a pixel of the uppermost row,
    when any first digital code of the one or more digital codes is smaller than the high threshold value, storing an address of a failed column corresponding to the first digital code, and
    when all digital codes of the one or more digital codes are equal to or higher than the high threshold value, outputting embedded data.

4. The method of operating an image sensing device of claim 1, wherein during the low test mode of the frame cycle, the control voltages are configured to de-select all pixels of the pixel array.

5. The method of operating an image sensing device of claim 4, wherein the detecting the operating error comprises, during the low test mode of the frame cycle:
    serially comparing the one or more digital codes and a low threshold value for each column of the pixel array,
    when any first digital code of the one or more digital codes is greater than the low threshold value, storing an address of a failed column associated with the first digital code, and
    when all digital codes of the one or more digital codes are equal to or less than the low threshold value, outputting embedded data.

6. The method of operating an image sensing device of claim 3, further comprising, when operating in the normal mode:
    disregarding a pixel value output from a second pixel associated with the stored address,
    averaging neighbor pixel values to obtain an averaged pixel value, wherein the neighbor pixel values are output from adjacent pixels of the second pixel, and
    outputting the averaged pixel value in place of a pixel value of the second pixel.

7. An image sensing device comprising:
    an analog logic unit configured to:
        select at least one row among a plurality of rows of a pixel array in accordance with a high test mode, a low test mode and a normal mode for a frame of a frame cycle,
        apply control voltages to a plurality of pixels, wherein the plurality of pixels comprises a first pixel, and the pixel array comprises a plurality of column lines, and
        output one or more digital codes obtained from one or more column line voltages; and
    a digital logic unit configured to:
        control an operating mode over time with respect to the frame cycle,
        serially receive input of the one or more digital codes depending on a column order in the low test mode or the high test mode,
        compare the one or more digital codes with a threshold value, and detect an operating error,
        wherein the high test mode is for testing one or more pixels of the plurality of pixels, and the low test mode is for testing one or more analog-to-digital converters.

8. The image sensing device of claim 7, wherein the analog logic unit is further configured to, when operating in the low test mode, de-select all pixels of the pixel array.

9. The image sensing device of claim 7, wherein the analog logic unit comprises:
    the pixel array, the pixel array comprising the plurality of pixels;
    a row driver configured to select and enable the at least one row in the pixel array; and
    an analog-digital converter configured to perform analog-to-digital conversion of one or more column line voltages into the one or more digital codes.

10. The image sensing device of claim 7, wherein the digital logic unit comprises:
    a timing control logic unit configured to control the operating mode of the analog logic unit;
    a comparison logic unit configured to:

compare the one or more digital codes in the low test mode or the high test mode with the threshold value, and detect the operating error; and an image signal processor configured to perform image processing based on the one or more digital codes received from the analog logic unit.

11. An image sensing device comprising:

a pixel array including a plurality of pixels arranged in at least one row and at least one column, wherein the plurality of pixels comprises a first pixel, and the pixel array comprises a plurality of column lines;

a row driver configured to select and control the at least one row;

a column-parallel analog-digital-converter (ADC) configured to convert a column line voltage into one or more digital codes;

digital logic unit configured to:
   continuously receive input of the one or more digital codes in a column order, and
   execute an operating error detection when in a test mode; and an image signal processor configured to receive and process the one or more digital codes when in a normal mode, wherein the image sensing device is configured to operate over time with respect to a frame cycle, the digital logic unit is further configured to control the image sensing device to operate in the test mode including a high test mode, a low test mode and the normal mode for a frame of the frame cycle, and the high test mode is for testing one or more pixels of the plurality of pixels, and the low test mode is for testing one or more analog-to-digital converters.

12. The image sensing device of claim 11, wherein when operating in the high test mode:

the row driver is configured to select an uppermost row of the pixel array, and the digital logic unit is configured to:
   compare the one or more digital codes with a high threshold value, and
   execute the operating error detection.

13. The image sensing device of claim 11, wherein when in the test mode is the low test mode:

the row driver is configured to de-select all pixels of the pixel array, and the digital logic unit is configured to
   compare the one or more digital codes with a low threshold value, and
   execute the operating error detection.

* * * * *